＝US008519573B2

(12) United States Patent
Keisuke et al.

(10) Patent No.: US 8,519,573 B2
(45) Date of Patent: Aug. 27, 2013

(54) RECIPROCATING VIBRATION GENERATOR

(75) Inventors: Furuich Keisuke, Ueda (JP); Takagi Takahiro, Ueda (JP)

(73) Assignee: Nidec Seimitsu Corporation, Ueda-shi, Nagano (JP)

( * ) Notice: Subject to any disclaimer, the term of this patent is extended or adjusted under 35 U.S.C. 154(b) by 181 days.

(21) Appl. No.: 13/022,043

(22) Filed: Feb. 7, 2011

(65) Prior Publication Data
US 2011/0198948 A1  Aug. 18, 2011

(30) Foreign Application Priority Data

Feb. 16, 2010 (JP) .................................. 2010-031207

(51) Int. Cl.
*H02K 33/00* (2006.01)
*H02K 35/00* (2006.01)

(52) U.S. Cl.
USPC ............................................. 310/15; 310/25

(58) Field of Classification Search
USPC ...................................................... 310/15, 25
See application file for complete search history.

(56) References Cited

U.S. PATENT DOCUMENTS

| 4,583,042 | A | * | 4/1986 | Riemer | 324/519 |
| 5,427,362 | A | * | 6/1995 | Schilling et al. | 267/140.14 |
| 5,528,697 | A | * | 6/1996 | Saito | 381/396 |
| 5,682,132 | A | * | 10/1997 | Hiroyoshi et al. | 340/407.1 |
| 5,831,353 | A | * | 11/1998 | Bolding et al. | 310/12.15 |
| 5,894,263 | A | * | 4/1999 | Shimakawa et al. | 340/388.1 |
| 6,047,672 | A | * | 4/2000 | Hanai et al. | 123/90.11 |
| 6,208,238 | B1 | * | 3/2001 | Ohta | 340/391.1 |
| 6,430,023 | B1 | * | 8/2002 | Suzuki | 361/290 |
| 6,465,746 | B1 | * | 10/2002 | Kajita | 174/260 |
| 6,487,300 | B1 | * | 11/2002 | Lee et al. | 381/396 |
| 6,492,899 | B1 | * | 12/2002 | Yamaguchi | 340/407.1 |
| 6,600,938 | B1 | * | 7/2003 | Suzuki | 455/567 |
| 6,628,798 | B2 | * | 9/2003 | Teshima et al. | 381/396 |
| 6,654,478 | B2 | * | 11/2003 | Tsuchikiri et al. | 381/412 |

(Continued)

FOREIGN PATENT DOCUMENTS

| JP | 2003-154314 A1 | 5/2003 |
| JP | 2007229582 A | * 9/2007 |
| JP | 2007229584 A | * 9/2007 |
| JP | 2007229680 A | * 9/2007 |

*Primary Examiner* — Tran Nguyen
*Assistant Examiner* — Alex W Mok
(74) *Attorney, Agent, or Firm* — Westerman, Hattori, Daniels & Adrian, LLP

(57) ABSTRACT

A reciprocating vibration generator making the magnetic circuit of a permanent magnet a closed loop so as to obtain a high vibration force, specifically a vibration linear actuator having a ring-shaped weight, a reciprocating vibrator having a ring-shaped permanent magnet in a center hole of the weight, a first plate spring and a second plate spring supporting this reciprocating vibrator with respect to a recessed case and an end plate to be able to elastically displace in a thickness direction between a first end face and a second end face, a tube-shaped toroidal coil running through a center hole of the ring-shaped permanent magnet and generating a reciprocating vibration magnetic field for driving the ring-shaped permanent magnet to reciprocate in the thickness direction, and a columnar core running through the inside of this toroidal coil, wherein the ring-shaped permanent magnet is magnetized in the thickness direction, and the toroidal coil has a lower stage toroidal coil and an upper stage toroidal coil coaxial with and adjacent to the same, wound in the opposite direction, and connected in series with the same.

9 Claims, 8 Drawing Sheets

(56) References Cited

U.S. PATENT DOCUMENTS

| | | | |
|---|---|---|---|
| 6,738,489 B2 * | 5/2004 | Chung et al. ................... | 381/396 |
| 6,777,895 B2 * | 8/2004 | Shimoda et al. ............... | 318/114 |
| 6,810,128 B2 * | 10/2004 | Kaneda et al. ................. | 381/396 |
| 6,847,139 B2 * | 1/2005 | Ueda et al. ..................... | 310/81 |
| 6,850,138 B1 * | 2/2005 | Sakai ............................. | 335/222 |
| 6,873,234 B2 * | 3/2005 | Kyouno et al. ................ | 335/278 |
| 6,954,016 B2 * | 10/2005 | Ueda et al. ..................... | 310/81 |
| 7,292,227 B2 * | 11/2007 | Fukumoto et al. ............ | 345/173 |
| 7,550,885 B2 * | 6/2009 | Takagi et al. .................. | 310/81 |
| 7,557,474 B2 * | 7/2009 | Kuwabara et al. ............. | 310/21 |
| 7,576,462 B2 * | 8/2009 | Miura ............................ | 310/89 |
| 7,619,498 B2 * | 11/2009 | Miura ............................ | 335/222 |
| 2002/0108446 A1 * | 8/2002 | Matsuki et al. ................. | 73/661 |
| 2003/0227225 A1 * | 12/2003 | Kaneda et al. .................. | 310/81 |
| 2005/0285454 A1 * | 12/2005 | Choi et al. ..................... | 310/14 |
| 2006/0266967 A1 * | 11/2006 | Miura ...................... | 251/129.15 |
| 2007/0164615 A1 * | 7/2007 | Lewis et al. .................... | 310/12 |
| 2007/0195512 A1 * | 8/2007 | Konno .......................... | 361/771 |
| 2007/0207672 A1 * | 9/2007 | Takagi et al. ................. | 439/607 |
| 2009/0121559 A1 * | 5/2009 | Lee ................................ | 310/28 |
| 2010/0066182 A1 * | 3/2010 | Yamazaki et al. .............. | 310/29 |
| 2010/0102646 A1 * | 4/2010 | Masami et al. ................. | 310/29 |
| 2010/0117607 A1 * | 5/2010 | Mochida ........................ | 322/99 |
| 2010/0206707 A1 * | 8/2010 | Yoshida ........................ | 200/516 |

\* cited by examiner

RECIPROCATING VIBRATION GENERATOR

CROSS-REFERENCE TO RELATED APPLICATION

This application is based upon and claims the benefit of priority of the prior Japanese Patent Application No. 2010, 031207, filed on Feb. 16, 2010, the entire contents of which are incorporated herein by reference.

BACKGROUND OF THE INVENTION

1. Field of the Invention

The present invention relates to a reciprocating vibration generator which is to be built into a mobile phone etc., more particularly relates to a structure of a reciprocating vibration generator having a weight engaging in reciprocating linear motion.

2. Description of the Related Art

As shown in FIG. 8, a vibration linear actuator 51 disclosed in Japanese Patent Publication (A) No. 2003-154314 is provided with a ring-shaped external yoke 54 as a weight having a ring-shaped permanent magnet 55 at its inner circumference side, a first plate spring 57 fastened to a first end face 54a of this external yoke 54 by elastically deforming an outer circumference side hanging part 57a, a second plate spring 56 the same as this first plate spring 57 and fastened to a second end face 54b of this external yoke 54 by elastically deforming an outer circumference side hanging part 56a, and a stator supporting the first and second plate springs 57 and 56 and having a coil 52 which generates a reciprocating vibration magnetic field at an inner circumference side of the permanent magnet 55, wherein this stator is provided with a plastic base 59 at a bottom surface of which a power feed land 61 is arranged and from which a shaft 58 stands and, with an internal yoke 53 on this base 59 having the shaft 58 at its center and forming also a coil bobbin of the coil 52. An inner circumference side 57b of the first plate spring 57 mates with a first projection 53a of the internal yoke 53, while an inner circumference side 56b of the second plate spring 56 mates with a second projection 53b of the internal yoke 53 and is sandwiched between the base 59 and internal yoke 53.

In the state with no power fed to the coil 52, the external yoke 54 serving as the weight remains at a standstill at an illustrated neutral position in the axial direction where the elastic recovery force outward at the first end face 54a side due to the first plate spring 57 and the elastic recovery force outward at the second end face 54b side due to the second plate spring 56 are balanced, but due to the alternating current flowing through the coil 52, an S-pole and an N-pole are alternately generated at the two ends of the internal yoke 53 in the axial direction, so the ring-shaped permanent magnet 55 magnetized in the radial direction receives a magnetic attraction/repulsion action in the axial direction due to the strong magnetic pole at the inner circumferential surface side close to the internal yoke 53 rather than the magnetic pole at the outer circumferential surface side, so the first plate spring 57 and the second plate spring 56 alternately are restored to the free state of their planar shapes in a repeated operation and the external yoke 54 engages in reciprocating linear motion in the thrust direction resulting in reciprocating vibration.

As the main related art, there is the above Japanese Patent Publication (A) No. 2003-154314 (FIG. 1).

In the above vibration linear actuator 51, due to the alternating current flowing through the coil 52, the two ends of the internal yoke 53 across the axial direction alternately switch between the S-pole and the N-pole, but the outer circumferential surface of the external yoke 54 becomes the opposite magnetic pole to the magnetic pole of the inner circumferential surface of the permanent magnet 55. The magnetic pole of the outer circumferential surface of the external yoke 54 rather has the effect of suppressing linear reciprocating vibration of the permanent magnet 55, so it is necessary to lengthen the distance from the inner circumferential surface of the permanent magnet 55 to the outer circumferential surface of the external yoke 54 so as to weaken that effect. The longer this is set, the more this runs counter to the reduction of size of the vibration linear actuator of course. The magnetic circuit of the permanent magnet 55 becomes an open loop, the vibration force becomes weaker. Obtaining the required vibration force leads to a larger size due to the increased number of turns of the coil 52 or an increase in the power consumption due to the increase in the alternating current.

SUMMARY OF THE INVENTION

Therefore, in view of the above problems, an object of the present invention is to provide a reciprocating vibration generator forming a magnetic circuit of a permanent magnet into a closed loop and thereby obtaining a high vibration force.

The reciprocating vibration generator according to the present invention is provided with a reciprocating vibrator having a ring-shaped permanent magnet at a center hole of a ring-shaped weight, suspension spring means for supporting this reciprocating vibrator with respect to a fastening part in a manner able to elastically displace in a thickness direction extending between a first end face and a second end face, a tube-shaped toroidal coil running through a center hole of the ring-shaped permanent magnet and generating a reciprocating vibration magnetic field for driving the ring-shaped permanent magnet to reciprocate in the thickness direction, and a core running through the inside of this toroidal coil, wherein the ring-shaped permanent magnet is magnetized in the thickness direction, and the toroidal coil has a first toroidal coil and a second toroidal coil coaxial with and adjacent to the same.

The magnetization direction of the toroidal coil and the magnetized direction of the ring-shaped permanent magnet are substantially parallel. Using the winding direction of the coil winding, the direction of feed of power to the coil, or the series structure or parallel structure of the coil, it is possible to make the inside end sides of the first toroidal coil and second toroidal coil the same magnetic pole, so along with the alternation of the coil current, a reciprocating vibration magnetic field for driving the ring-shaped permanent magnet to reciprocate in its thickness direction is generated. In a ring-shaped permanent magnet magnetized in the thickness direction, the magnetic circuit can be made a closed loop and leakage flux can be suppressed. This contributes to improvement of the vibration strength or reduction of the power consumption. Further, being a closed loop magnetic circuit, if the coil current is cut, a reverse electromotive force will occur due to the inertial vibration of the ring-shaped permanent magnet and, as a counteraction, a braking force acts on the reciprocating vibrator and the time for attenuation of the vibration can be shortened.

When provided with a first ring-shaped pole piece superposed at the first end face and having an inner circumferential edge approaching an outer circumferential surface of the first toroidal coil and a second ring-shaped pole piece superposed at the second end face and having an inner circumferential edge approaching an outer circumferential surface of the second toroidal coil, the inner circumferential surface of the first ring-shaped pole piece trapping the flux at the first end face side and the inner circumferential surface of the second ring-shaped pole piece trapping the flux at the second end face approach the outer circumferential surface of the core, whereby the magnetic resistance is lowered, so it is possible to improve the vibration strength or reduce the power consumption more and possible to realize rapid attenuation of vibration.

Preferably, the outer circumferential surface of the toroidal coil is covered by a protective tubular member. At the time of impact upon being dropped etc., the inner circumferential surface of the ring-shaped permanent magnet can be prevented from striking the outer circumferential surface of the toroidal coil and therefore the generator can be protected from coil breakage problems.

When a magnetic fluid is interposed between an outer circumferential surface of the protective tubular member and an inner circumferential surface of the ring-shaped permanent magnet, even if external force of impact is given, the magnetic fluid becomes a buffer material, so it is possible to effectively keep the ring-shaped permanent magnet from sharply striking the protective tubular member.

In the above reciprocating vibration generator, preferably the fastening part has a recessed case and an end plate fastened to an open side of the recessed case, the toroidal coil is mounted on a printed circuit board, and the end plate has a through hole of a size enabling passage of the toroidal coil. After obtaining the assembly of the recessed case and the end plate, it is possible to simply inject the magnetic fluid through the through hole of the end plate and coat the inner circumferential surface of the ring-shaped permanent magnet. Not only this, after this, it is possible to insert the toroidal coil from this through hole and fasten the printed circuit board to the back surface of the end plate and therefore possible to facilitate manufacture.

To prevent the generation of electromagnetic interference from the reciprocating vibration generator, it is necessary to ground and shield the external housing comprised of the recessed case and end plate, but preferably, as the power feed structure of the ground potential for the end plate, the end plate has a conductive projection contacting a conductive rubber piece adhered to a back surface of the printed circuit board through a notch formed in the printed circuit board. This is not a connection structure of the end plate and a pattern of the printed circuit board, but a direct connection structure of a conductive projection of the endplate and the conductive rubber piece, so it is possible to obtain the conductive projection at the time of press formation of the end plate and possible to realize lower cost.

Summarizing the advantageous effects of the present invention, the present invention makes the magnetization direction of the toroidal coil and the magnetized direction of the ring-shaped permanent magnet substantially parallel and makes the inside ends of the first toroidal coil and the oppositely wound series second toroidal coil the same magnetic pole, so the magnetic circuit becomes a closed loop. This contributes to improvement of the vibration strength or reduction of the power consumption. Further, it enables reduction of the time for attenuation of vibration.

BRIEF DESCRIPTION OF THE DRAWINGS

These and other objects and features of the present invention will become clearer from the following description of the preferred embodiments given with reference to the attached drawings, wherein:

FIG. 1A is a perspective view showing a vibration linear actuator according to an embodiment of the present invention, while

FIG. 5A is a perspective view showing the combination of the case side structure and the back lid side structure of the vibration linear actuator, while

DESCRIPTION OF THE PREFERRED EMBODIMENTS

Figure 1A:
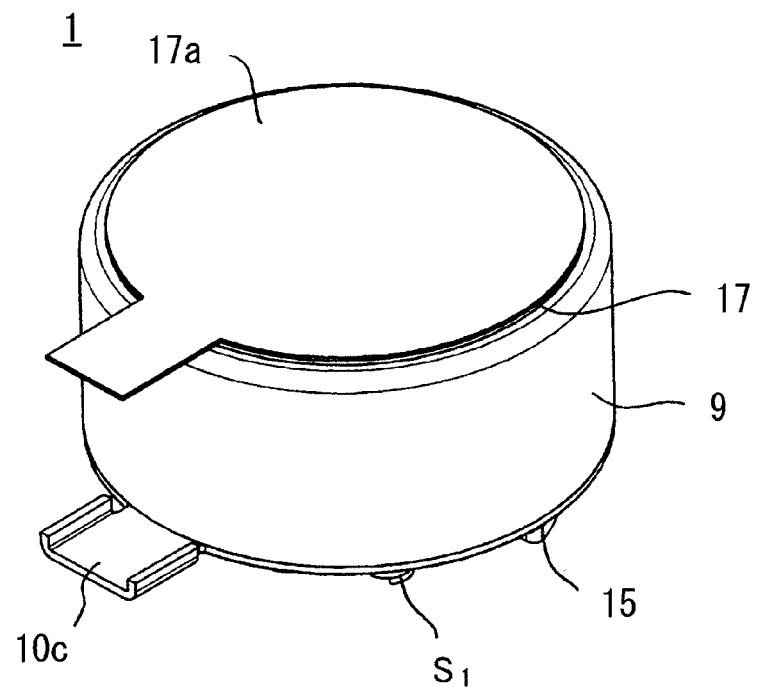
Figure 1B:
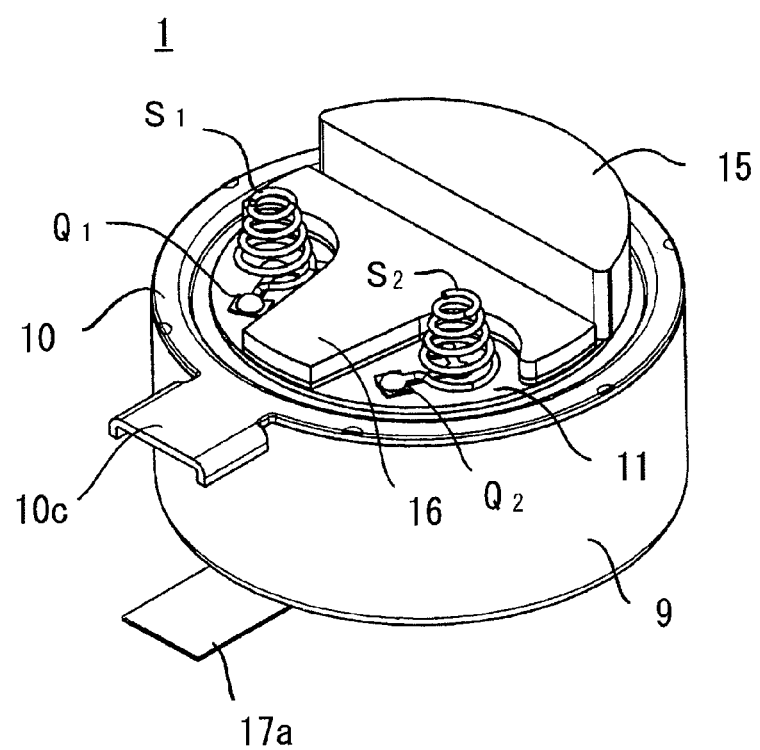
FIG. 1B is a perspective view showing an inverted state of the vibration linear actuator.
Figure 2:
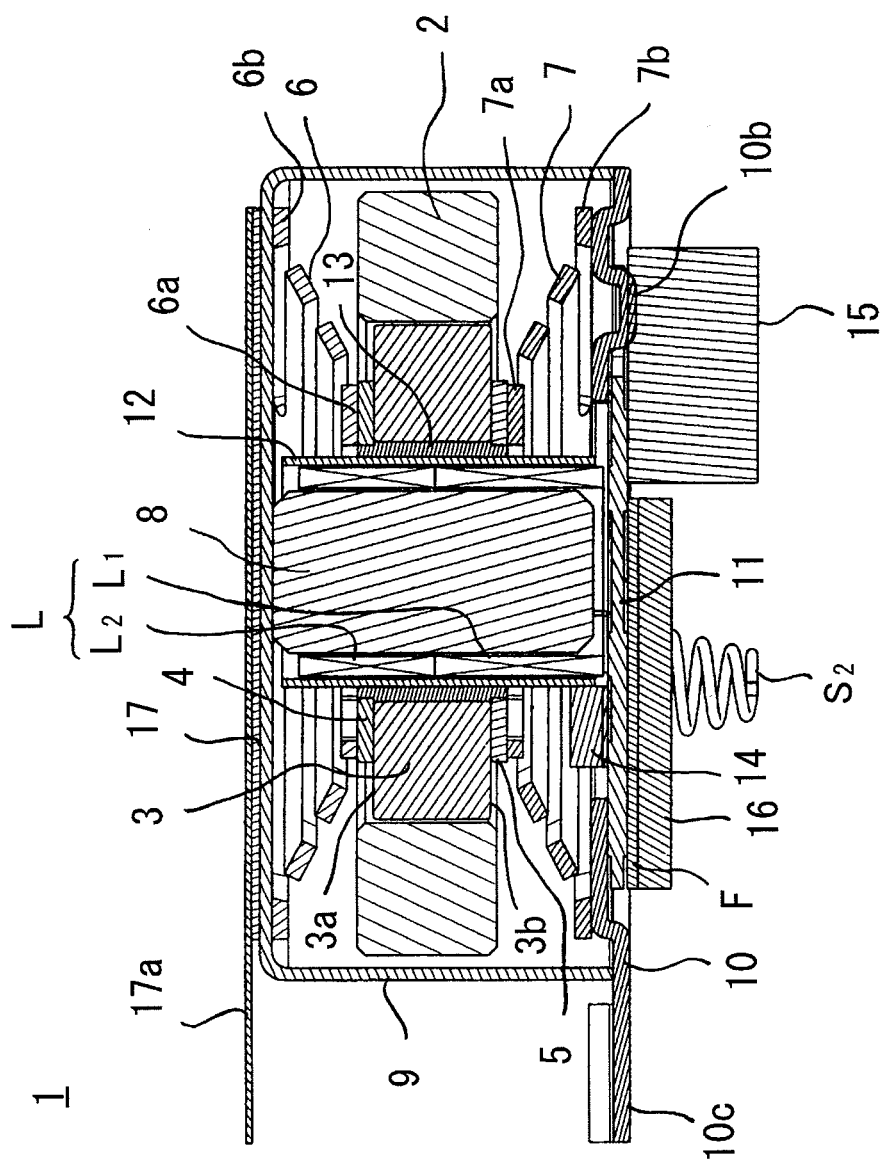
FIG. 2 is a longitudinal cross-sectional view of a vibration linear actuator.
Figure 3:
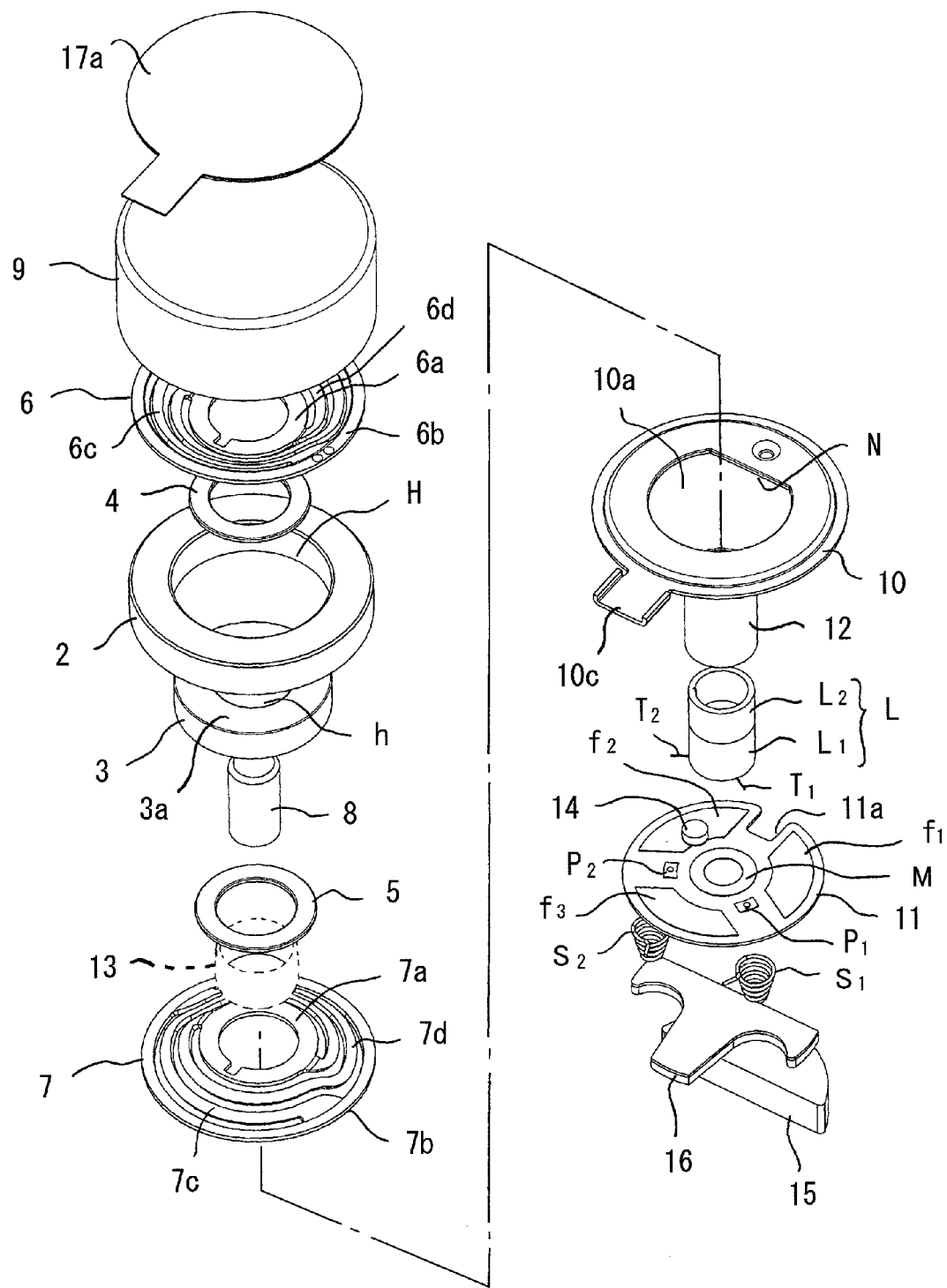
FIG. 3 is an assembled perspective view of a vibration linear actuator seen from above.
Figure 4:
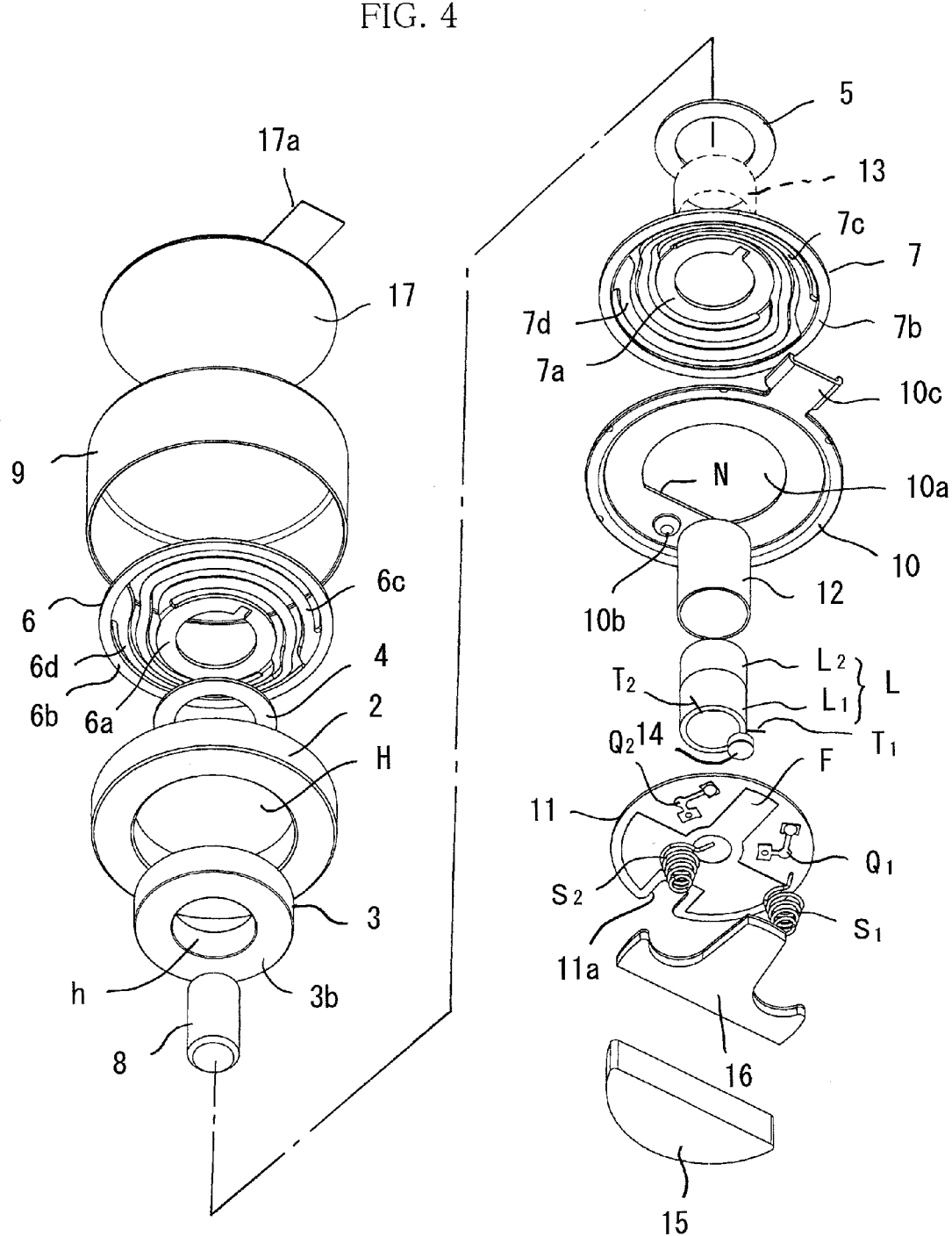
FIG. 4 is an assembled perspective view of the vibration linear actuator seen from below.
Figure 5A:
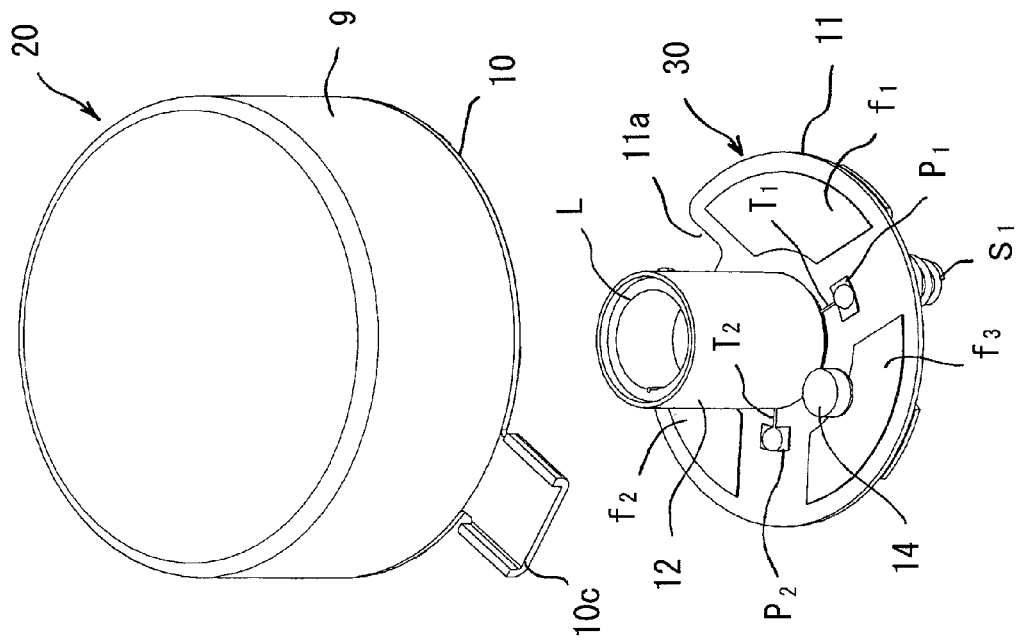
Figure 5B:
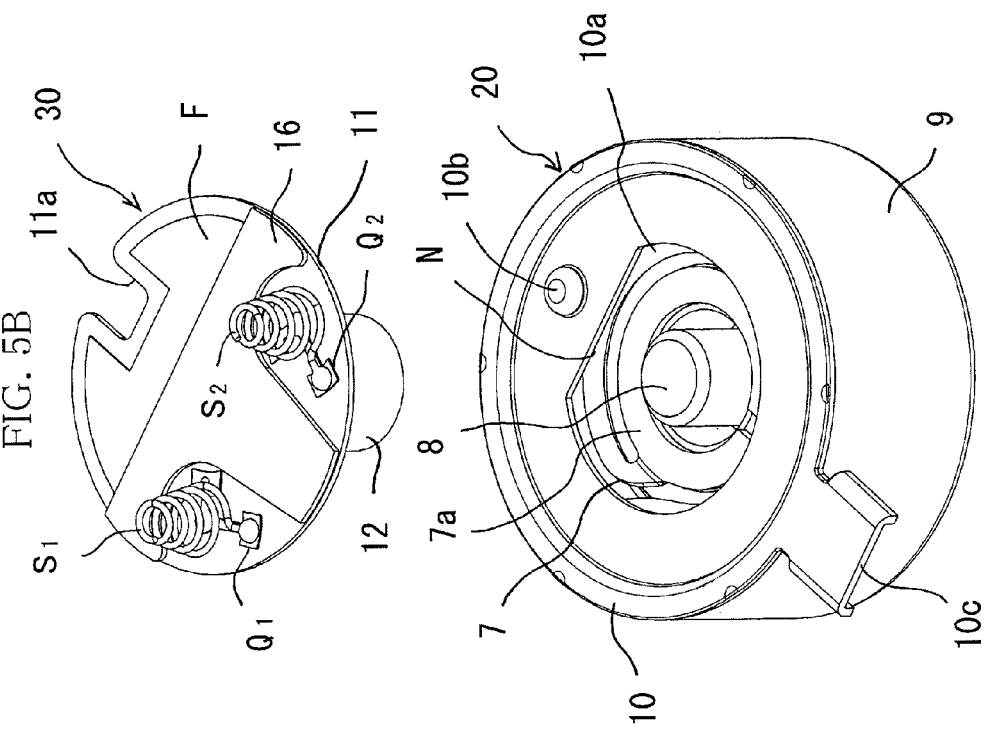
FIG. 5B is a perspective view showing the combination of the case side structure and the back lid side structure inverted.

Next, an embodiment of the present invention will be explained based on the attached drawings. A vibration linear actuator 1 of the present embodiment is provided with a ring-shaped weight 2, a ring-shaped permanent magnet 3 fit in a center hole H of the weight 2 and magnetized by a single pole in a thickness direction between a first end face 3a and a second end face 3b, a ring-shaped first pole piece plate 4 adhered to the first end face 3a by an adhesive, a ring-shaped second pole piece plate 5 adhered to the second end face 3b by an adhesive, a first plate spring 6 having an inner circumference side hanging part 6a fastened to the first pole piece plate 4 by for example spot welding, adhesion, or another means and having an outer circumference side hanging part 6b fastened to a bottom surface of a recessed case 9, a second plate spring 7 having an inner circumference side hanging part 7a fastened to the second pole piece plate 5 and having an outer circumference side hanging part 7b fastened to an end plate 10 fastened to an opening side of the recessed case 9, a columnar core (iron core) 8 passing through a center hole h of the ring-shaped permanent magnet 3 and fastened standing up at the bottom surface of the recessed case 9, a cylindrically shaped toroidal coil L standing up on a printed circuit board 11 adhered to the back surface of the end plate 10 and fit from a through hole 10a of the end plate 10 over the columnar core 8, a plastic protective tubular member 12 standing up on the printed circuit board 11 and fit over the toroidal coil L, a magnetic fluid 13 filled in the space between the inner circumferential surface of the ring-shaped permanent magnet 3 and the outer circumferential surface of the protective tubular member 12 sandwiched between the first pole piece plate 4 and the second pole piece plate 5, a rubber damper 14 adhered on the printed circuit board 11 and buffering against sharp impact of an inner circumference side hanging part 7a of the second plate spring 7 on the printed circuit board 11, a pair of spiral spring terminals $S_1$, $S_2$ connected to the back surface of the printed circuit board 11, a soft crescent-shaped conductive rubber piece 15 bonded to the back surface of the printed circuit board 11 while straddling a notch 11a and contacting a conductive projection 10b of the end plate 10 through the notch 11a, a hard, substantially T-shaped rubber sheet 6 bonded with the back surface of the printed circuit board 11 for being closely held in a holding space (not shown) of the vibration linear actuator 1 itself, and a double-sided tape 17 with a peeloff sheet 17*a* adhered to the recessed case 9.

Figure 6:
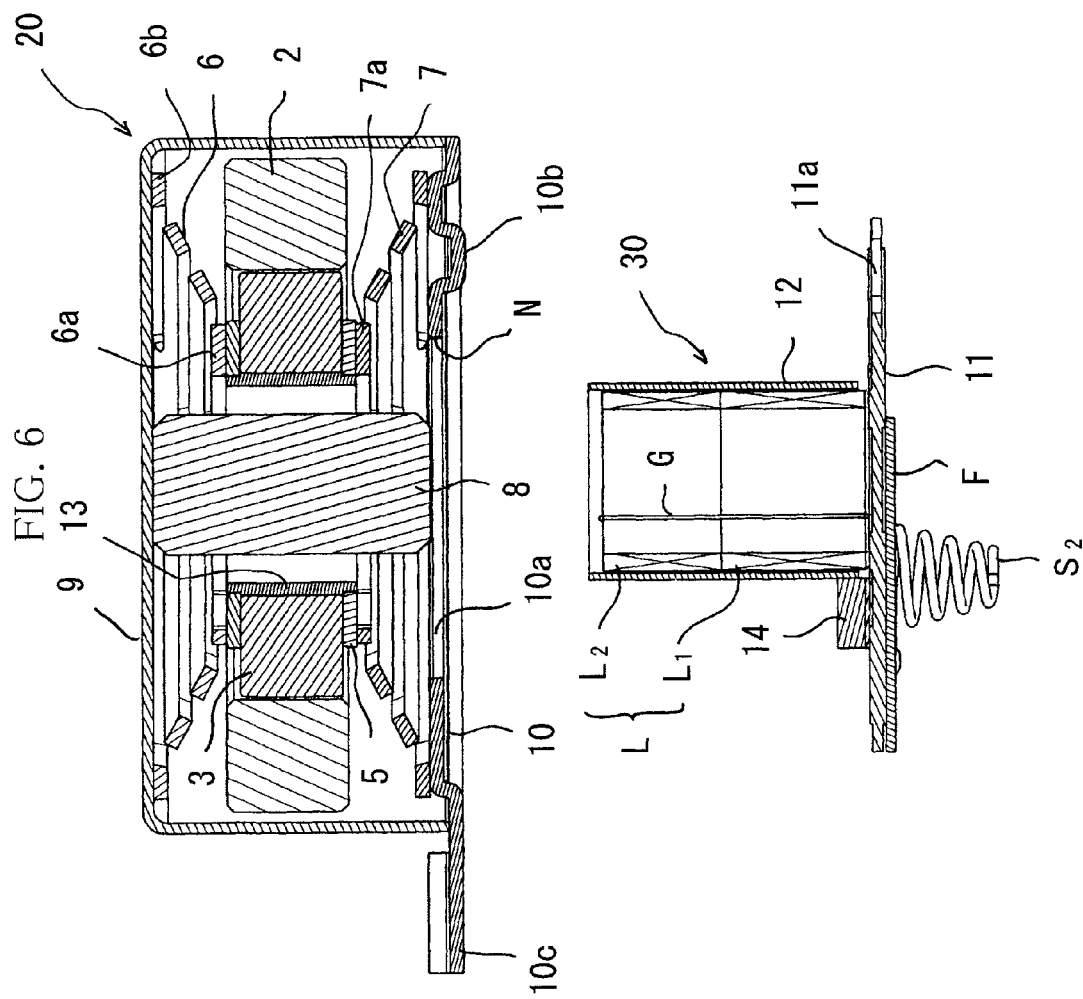
FIG. 6 is a longitudinal cross-sectional view showing the combination of the case side structure and the back lid side structure.
Figure 7A:
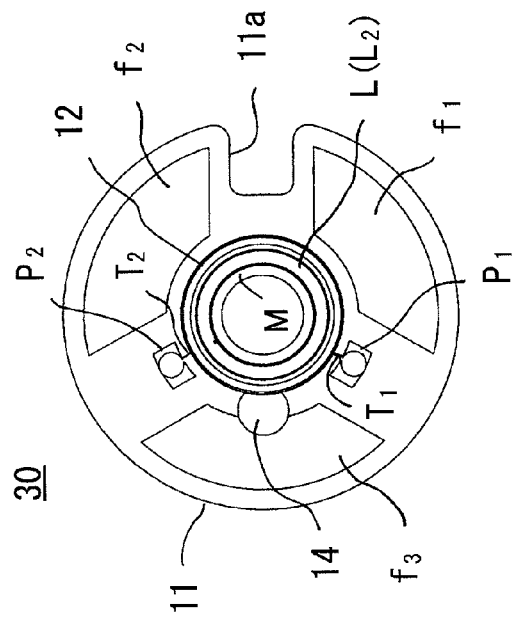
FIG. 7A is a front view of the back lid side structure.
Figure 7B:
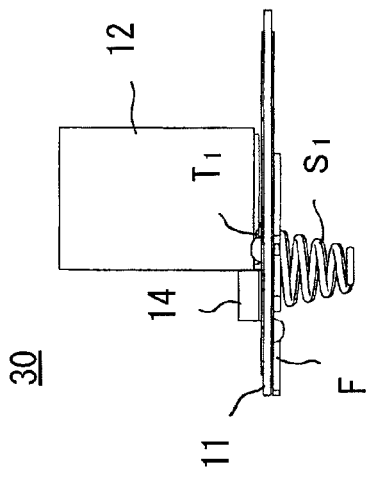
FIG. 7B is a bottom view of the back lid side structure.
Figure 7C:
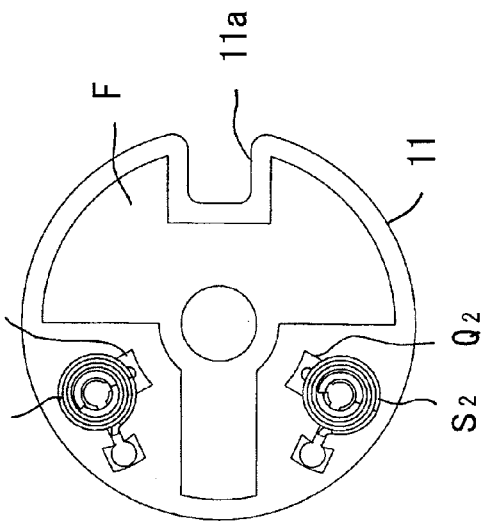
FIG. 7C is a plan view of the back lid side structure.
Figure 8:
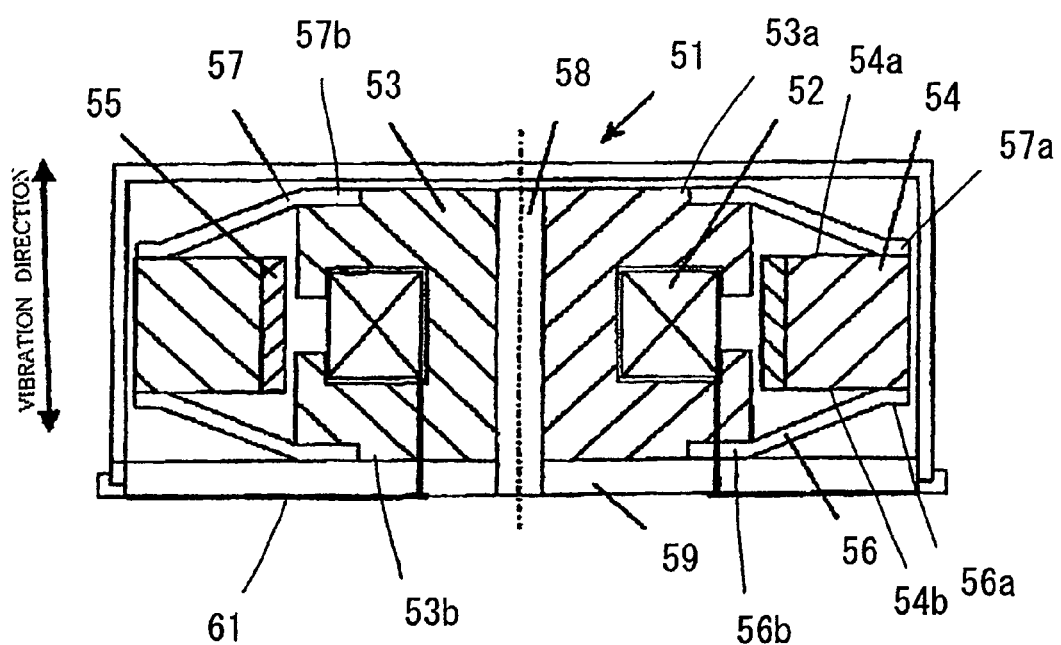
FIG. 8 is a longitudinal cross-sectional view of a conventional vibration linear actuator.

The toroidal coil L includes a cylindrically shaped lower stage (the second) toroidal coil $L_1$ and a coaxial, superposed, cylindrically shaped, oppositely wound series upper stage (the first) toroidal coil $L_2$. The first winding terminal $T_1$ bulging out from the end face of the lower stage toroidal coil $L_1$ is soldered to a first coil connection pattern $P_1$ on the printed circuit board 11, while the second winding terminal $T_2$ bulging out from the end face of the lower stage toroidal coil $L_1$ from the upper stage toroidal coil $L_2$ to the lower stage toroidal coil $L_1$ at the inner circumferential side is soldered to a second coil connection pattern $P_2$ on the printed circuit board 11. The method of production of this toroidal coil L is to wind a wire from the first winding terminal $T_1$ side in one direction in several layers to form the lower stage toroidal coil $L_1$, then wind it in the opposite direction in several layers to form the upper stage toroidal coil $L_2$, run a cross wire G (see FIG. 6) along the base line direction of the upper stage toroidal coil $L_1$ at the inner circumferential surface, and cause the end face of the second winding terminal $T_2$ to bulge out from the end face.

Note that, this cross wire G can be pulled around to the outer circumferential surface of the toroidal coil L and brought to the end face of the lower stage toroidal coil $L_1$.

In this example, the inner circumferential edge of the first pole piece plate 4 bulges out somewhat from the inner circumferential surface of the ring-shaped permanent magnet 3 to the upper stage toroidal coil $L_2$ side and the inner circumferential edge of the second pole piece plate 5 bulges out from the inner circumferential surface of the ring-shaped permanent magnet 3 to the lower stage toroidal coil $L_1$ side.

The first plate spring 6 has spiral elastic wires 6*c* and 6*d* extending in an approximately 360° spiral shape from 180° rotationally symmetric positions of the outer circumferential side edges of the ring-shaped inner circumference side hanging part 6*a* and connecting to the inner circumference side edge of the ring-shaped outer circumference side hanging part 6*b*. The second plate spring 7 also has spiral elastic wires 7*c* and 7*d* extending in an approximately 360° spiral shape from 180° rotationally symmetric positions of the outer circumferential side edges of the ring-shaped inner circumference side hanging part 7*a* and connecting to the inner circumference side edge of the ring-shaped outer circumference side hanging part 7*b*.

The stainless steel or SPCC end plate 10 is recessed at the back surface side for accommodation of the printed circuit board 11. It has a positioning piece 10*c*. At the opposite side, a conductive projection 10*b* bulging out to the back surface side is press-formed. A through hole 10*a* is not a true circle, but has a straight edge N forming a chord for leaving room for forming the conductive projection 10*b*.

The printed circuit board 11 is provided, at its front surface side, with not only a first coil connection pattern $P_1$ and a second coil connection pattern $P_2$, but also a ring-shaped coil receiving pattern M mounting the toroidal coil L and fan-shaped reinforcement patterns $f_1$ to $f_3$ surrounding this coil receiving pattern M in three directions and is provided, at its back surface side, with a first terminal connection pattern $Q_1$ and second terminal connection pattern $Q_2$ for connection via the through holes to the first coil connection pattern $P_1$ and second coil connection pattern $P_2$ and soldering to the conical bottom surface sides of the spring terminals $S_1$ and $S_2$ and a reinforcement pattern F surrounding the notch 11*a* and extending between the first terminal connection pattern $Q_1$ and second terminal connection pattern $Q_2$.

In the present example, the end plate 10 is provided with the through hole 10*a* so as to thereby, as shown in FIG. 5A to FIG. 7C, enable the case side structure 20 and the back lid side structure 30 to be assembled and a vibration linear actuator 1 to be obtained. The case side structure 20 is formed by assembling the recessed case 9, the columnar core 8 fastened implanted at the bottom surface of this recessed case 9, the ring-shaped weight 2, ring-shaped permanent magnet 3, the first pole piece plate 4, the second pole piece plate 5, the first plate spring 6, the second plate spring 7, and the end plate 10, then injecting the magnetic fluid 13 through the through hole 10*a* of the end plate 10 to coat the inner circumferential surface of the ring-shaped permanent magnet 3. On the other hand, the back lid side structure 30 includes the toroidal coil L, the protective tubular member 12, and the rubber damper 14 mounted on the printed circuit board 11 and the spring terminals $S_1$ and $S_2$ connected to the back surface of the printed circuit board 11 and bonded to the rubber sheet 16. The columnar core 8 of the case side structure 20 is fit through the through hole 10*a* of the end plate 10 and into the hollow part of the toroidal coil L, and the printed circuit board 11 is bonded to the recess at the back surface side of the end plate 10. After this, the crescent-shaped conductive rubber piece 15 is bonded to the back surface of the printed circuit board 11, and a double-sided tape 17 is stuck to the recessed case 9.

In the present example, the magnetized direction of the ring-shaped permanent magnet 3 is substantially parallel to the direction of the columnar core 8 in the toroidal coil L. In the flux emerging from the first end face 3*a* or second end face 3*b* of the ring-shaped permanent magnet 3, the flux sneaking around to the inner circumference side jumps over the gap to the outer circumferential surface of the columnar core 8 and passes through the inside of the columnar core 8, so the magnetic fluid 13 interposed in the clearance between the outer circumferential surface of the protective tubular member 12 and the inner circumferential surface of the ring-shaped permanent magnet 3 is sealed in state by the flux jumping over the gap. Regardless of the posture of the reciprocating vibration generator, it is therefore possible to prevent leakage of magnetic fluid 13. Further, due to the magnetic fluid 13 acting as this buffer layer, even if external force of impact is given, it is possible to effectively keep the reciprocating vibrator from sharply striking the toroidal coil L and therefore possible to prevent damage to the toroidal coil L. It is also possible to not use the magnetic fluid 13 and instead cover the toroidal coil L with the protective tubular member 12 so as to protect the toroidal coil L from damage due to being sharply struck by the reciprocating vibrator. Since there is the protective tubular member 12, the gap with the ring-shaped permanent magnet 3 can be made very small. This contributes to the reduction of size of the reciprocating vibration generator. Further, since the gap is very small, it is not necessary to use a high viscosity magnetic fluid 13 which is not excellent in low temperature characteristics. It is sufficient to use low viscosity, inexpensive magnetic fluid 13 which is excellent in low temperature characteristics. Note that, this protective tubular member 12 is preferably made of a slippery material. It may be a metal material or plastic material of course and may also be a heat shrinkable tube.

Further, since the magnetization direction of the toroidal coil L and the magnetized direction of the ring-shaped permanent magnet 3 are substantially parallel, the inside end sides of the lower stage toroidal coil $L_1$ and the oppositely wound series upper stage toroidal coil $L_2$ become the same magnetic pole, so, along with the alternation of the coil current, a reciprocating vibration magnetic field is generated for driving the ring-shaped permanent magnet 3 to reciprocate in the thickness direction. In a ring-shaped permanent magnet 3 magnetized in the thickness direction, the magnetic circuit becomes a closed loop and leakage flux can be suppressed. This contributes to the improvement of the vibration strength or the reduction of the power consumption. Further, since being a closed loop magnetic circuit, if the coil current is cut, vibration inertia causes an inverse electromotive force in the toroidal coil L. As a counteraction, a braking force acts on the reciprocating vibrator. It is therefore possible to realize a reduction in the time for attenuation of vibration.

The first pole piece plate 4 is superposed at the first end face 3a of the ring-shaped permanent magnet 3, while the second pole piece plate 5 is superposed at the second end face 3b of the ring-shaped permanent magnet 3, so the inner circumferential surface of the first pole piece plate 4 trapping the flux at the first end face 3a side and the inner circumferential surface of the second pole piece plate 5 trapping the flux at the second end face 3b side approach the outer circumferential surface of the columnar core 8 whereby the magnetic resistance is lowered. Further, the flux density for jumping over this gap becomes high, so it is possible to further improve the vibration strength or lower the power consumption and it is possible to rapidly attenuate the vibration. Further, the sealing ability of the magnetic fluid 13 is improved.

In particular, in the present example, the inner circumferential surfaces of the first pole piece plate 4 and the second pole piece plate 5 bulge out from the inner circumferential surface of the ring-shaped permanent magnet 3 to the protective tubular member 12 side, so the flux density for jumping the gap between the inner circumferential surfaces of the pole piece plates 4 and 5 and the outer circumferential surface of the columnar core 8 becomes higher, so the ability to seal in the magnetic fluid 13 is raised.

Further, the outer circumferential surface of the toroidal coil L is covered by the protective tubular member 12 such as a heat-shrinkable tube or other member, so at the time of impact due to being dropped etc., it is possible to prevent the inner circumferential surface of the ring-shaped permanent magnet 3 from sharply striking the outer circumferential surface of the toroidal coil L and possible to protect the actuator from coil breakage problems.

Magnetic fluid 13 is interposed between the outer circumferential surface of the protective tubular member 12 and the inner circumferential surface of the ring-shaped permanent magnet 3, so even if an external force of impact is applied, the magnetic fluid 13 becomes a buffer material, so it is possible to effectively suppress sharp impact of the ring-shaped permanent magnet 3 to the protective tubular member 12. Note that, even when there is no protective tubular member 12, since magnetic fluid 13 is interposed between the outer circumferential surface of the toroidal coil L and the inner circumferential surface of the ring-shaped permanent magnet 3, it is possible to keep the inner circumferential surface of the ring-shaped permanent magnet 3 from striking the outer circumferential surface of the toroidal coil L.

In the assembled structure of the vibration linear actuator 1, the end plate 10 has a through hole 10a of a size enabling passage of the toroidal coil L, so not only is it possible to simply inject magnetic fluid 13 through this through hole 10a to coat the inner circumferential surface of the ring-shaped permanent magnet 3, but also, after this, it is possible to insert the toroidal coil L from this through hole 10a and fasten the printed circuit board 11 to the back surface of the end plate 10 and possible to try to facilitate production.

To prevent the generation of electromagnetic interference from the vibration linear actuator 1, it is necessary to ground and shield the outer housing having the recessed case 9 and the end plate 10. As the structure for feeding a ground potential to the end plate 10, the end plate 10 has the conductive projection 10b contacting the conductive rubber piece 15 adhered to the back surface of the printed circuit board 11 through the notch 11a formed in the printed circuit board 11. This is not a structure where the end plate 10 contacts a pattern of the printed circuit board 11, but a structure directly connecting the conductive projection 10b of the end plate 10 and the conductive rubber piece 15, so it is possible to obtain the conductive projection 10b when press-forming the end plate 10 and possible to realize lower cost.

Note that, in this example, the series connection lower stage toroidal coil $L_1$ and upper stage toroidal coil $L_2$ were explained, but a parallel connection structure of the two coils may also be employed for reducing the resistance loss.

Above, one mode for working the present invention was explained, but the present invention is not limited to the reciprocating vibration generator explained in this embodiment and can be applied to all reciprocating vibration generator structures having a reciprocating vibrator and a tube-shaped coil generating a reciprocating vibration magnetic field for driving reciprocation of this reciprocating vibrator.

While the invention has been described with reference to specific embodiments chosen for purpose of illustration, it should be apparent that numerous modifications could be made thereto by those skilled in the art without departing from the basic concept and scope of the invention.

The invention claimed is:

1. A reciprocating vibration generator comprising:
    a reciprocating vibrator comprising a ring-shaped permanent magnet having a center hole, wherein the ring-shaped permanent magnet has a first end face and a second end face, wherein a thickness direction is defined as a direction extending between the first end face and the second end face, wherein the ring-shaped permanent magnet is magnetized in said thickness direction;
    suspension spring means for supporting said reciprocating vibrator with respect to a fastening part in a manner able to be elastically displaced in the thickness direction;
    a first tube-shaped toroidal coil running through the center hole of the ring-shaped permanent magnet, the first tube-shaped toroidal coil having a first inside end, and
    a second tube-shaped toroidal coil running through the center hole of the ring-shaped permanent magnet, the second tube-shaped toroidal coil having a second inside end,
    wherein a magnetization direction of the first tube-shaped toroidal coil and the second tube-shaped toroidal coil substantially corresponds to the thickness direction,
    wherein the second tube-shaped toroidal coil is coaxial with the first tube-shaped toroidal coil such that the first inside end faces the second inside end,
    wherein the first inside end and the second inside end have the same magnetic pole.

2. A reciprocating vibration generator as set forth in claim 1, further comprising:
    a first ring-shaped pole piece superposed at said first end face and having an inner circumferential edge approaching an outer circumferential surface of said first toroidal coil and;
    a second ring-shaped pole piece superposed at said second end face and having an inner circumferential edge approaching an outer circumferential surface of said second toroidal coil.

3. A reciprocating vibration generator as set forth in claim 1, wherein said outer circumferential surface of both of the first tube-shaped toroidal coil and the second tube-shaped toroidal coil is covered by a protective tubular member.

4. A reciprocating vibration generator as set forth in claim 1, wherein a magnetic fluid is interposed between an outer circumferential surface of said protective tubular member and an inner circumferential surface of said ring-shaped permanent magnet.

5. A reciprocating vibration generator as set forth in claim 1, wherein said fastening part has a recessed case and an end plate fastened to an open side of said recessed case, the first tube-shaped toroidal coil and the second tube-shaped toroidal coil are mounted on a printed circuit board, and said end plate has a through hole of a size enabling passage of said toroidal coil.

6. A reciprocating vibration generator as set forth in claim 5, wherein said end plate has a conductive projection contacting a conductive rubber piece adhered to a back surface of said printed circuit board through a notch formed in said printed circuit board.

7. The reciprocating vibration generator according to claim 1, wherein the reciprocating vibrator further comprising a ring-shaped weight provided on the ring-shaped permanent magnet.

8. The reciprocating vibration generator according to claim 1, further comprising a core running through an inside of the tube-shaped toroidal coil and an inside of the second tube-shaped toroidal coil.

9. A reciprocating vibration generator comprising:
a reciprocating vibrator having a ring-shaped permanent magnet at a center hole of a ring-shaped weight;
suspension spring means for supporting said reciprocating vibrator with respect to a fastening part in a manner able to be elastically displaced in a thickness direction extending between a first end face and a second end face;
a tube-shaped toroidal coil running through a center hole of said ring-shaped permanent magnet and generating a reciprocating vibration magnetic field for driving said ring-shaped permanent magnet to reciprocate in said thickness direction; and
a core running through the inside of said toroidal coil, wherein:
said ring-shaped permanent magnet is magnetized in said thickness direction, and said toroidal coil has a first toroidal coil and a second toroidal coil coaxial with and adjacent to the same,
wherein said fastening part has a recessed case and an end plate fastened to an open side of said recessed case, said toroidal coil is mounted on a printed circuit board, and said end plate has a through hole of a size enabling passage of said toroidal coil,
wherein said end plate has a conductive projection contacting a conductive rubber piece adhered to a back surface of said printed circuit board through a notch formed in said printed circuit board.

* * * * *

UNITED STATES PATENT AND TRADEMARK OFFICE
CERTIFICATE OF CORRECTION

PATENT NO.        : 8,519,573 B2
APPLICATION NO.   : 13/022043
DATED             : August 27, 2013
INVENTOR(S)       : Keisuke Furuichi et al.

It is certified that error appears in the above-identified patent and that said Letters Patent is hereby corrected as shown below:

On the Title page, Item (75)
Change

(75)    Inventors: Furuich Keisuke, Ueda (JP); Takagi Takashiro, Ueda (JP)

To be

(75)    Inventors: Keisuke Furuichi, Ueda (JP); Takahiro Takagi, Ueda (JP)

Signed and Sealed this
Twentieth Day of May, 2014

Michelle K. Lee
*Deputy Director of the United States Patent and Trademark Office*